United States Patent
Saeki et al.

(10) Patent No.: US 6,756,460 B2
(45) Date of Patent: Jun. 29, 2004

(54) WATER-SOLUBLE COPOLYMER AND ITS PRODUCTION PROCESS AND USE

(75) Inventors: Takuya Saeki, Suita (JP); Junichi Nakamura, Takatsuki (JP); Yoshikazu Fujii, Suita (JP); Masahito Takagi, Suita (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/930,274

(22) Filed: Aug. 16, 2001

(65) Prior Publication Data

US 2002/0049147 A1 Apr. 25, 2002

(30) Foreign Application Priority Data

Aug. 22, 2000 (JP) ........................................ 2000-250963
Aug. 23, 2000 (JP) ........................................ 2000-253003

(51) Int. Cl.$^7$ ............................................. C08F 220/46
(52) U.S. Cl. .................. 526/317.1; 526/79; 526/80; 526/81; 526/271; 526/272; 526/280; 526/281; 526/318.2; 525/403; 525/404; 525/434; 524/513; 210/701
(58) Field of Search ............................. 526/317.1, 79, 526/80, 81, 271, 318.2, 280, 287, 272; 210/701; 525/404, 434, 403; 524/513; 510/361

(56) References Cited

U.S. PATENT DOCUMENTS

| | | | | |
|---|---|---|---|---|
| 5,135,677 A | * | 8/1992 | Yamaguchi et al. | ........ 252/180 |
| 5,733,857 A | * | 3/1998 | Yamaguchi et al. | ........ 510/361 |
| 5,856,288 A | * | 1/1999 | Saeki et al. | .................. 510/360 |
| 5,948,268 A | * | 9/1999 | Yamaguchi et al. | ........ 210/701 |
| 5,952,432 A | * | 9/1999 | Yamaguchi et al. | ........ 525/404 |
| 6,444,771 B1 | * | 9/2002 | Yamaguchi et al. | ..... 526/317.1 |

FOREIGN PATENT DOCUMENTS

| EP | 1 103 570 A2 | 5/2001 |
|---|---|---|
| JP | 468323 | 11/1992 |

* cited by examiner

*Primary Examiner*—Tatyana Zalukaeva
(74) *Attorney, Agent, or Firm*—Roylance, Abrams, Berdo & Goodman, L.L.P.

(57) ABSTRACT

The present invention provides: a novel water-soluble copolymer which is excellent in performance for uses, such as detergent builders, pigment dispersants, and scale inhibitors. In addition, the present invention provides: a novel liquid detergent builder which has extremely excellent compatibility, high transparency when a liquid detergent composition comprises it, and excellent detergency; and a novel liquid detergent composition comprising the liquid detergent builder. The water-soluble copolymer, according to the present invention, is a novel water-soluble copolymer obtained by copolymerizing comonomers essentially including: an unsaturated monocarboxylic acid monomer (1); an unsaturated dicarboxylic acid monomer (2); and an unsaturated alcoholic monomer (3) having specific structures, with the copolymer being characterized in that the residual amount of the unsaturated dicarboxylic acid monomer is not more than 8 weight %, and the residual amount of the unsaturated alcoholic monomer is not more than 45 weight %.

15 Claims, No Drawings

WATER-SOLUBLE COPOLYMER AND ITS PRODUCTION PROCESS AND USE

BACKGROUND OF THE INVENTION

A. Technical Field

The present invention relates to a novel water-soluble copolymer, and its production process and use.

B. Background Art

Water-soluble polymers are preferably used as detergent builders, pigment dispersants, and scale inhibitors. Examples thereof as well known conventionally includes (co)polymers of unsaturated carboxylic acids, such as acrylic acid, methacrylic acid, α-hydroxyacrylic acid, itaconic acid, maleic acid, fumaric acid, crotonic acid, and citraconic acid.

Furthermore, the study of improving the (co)polymers is extensively carried out in recent years for the purpose of raising the performance for uses such as detergent builders, pigment dispersants, and scale inhibitors.

As to copolymers having particularly excellent improvement of performance, JP-B-68323/1992 discloses a binary copolymer of a specific unsaturated alcoholic monomer and a specific unsaturated carboxylic acid monomer.

However, it is not said that the above binary copolymer has still sufficient performance for uses, such as detergent builders, pigment dispersants, and scale inhibitors, and it is desired to raise the performance further.

In addition, detergent builders comprising the above conventional unsaturated carboxylic acid (co)polymer and its improved material as a base material could display comparatively high-level performance.

However, the detergent builders comprising the conventional unsaturated carboxylic acid (co)polymer have extremely bad compatibility with surfactants, therefore, there were disadvantages in that the detergent builder was not suitable for liquid detergent use.

SUMMARY OF THE INVENTION

A. Object of the Invention

Accordingly, an object of the present invention is to provide: a novel water-soluble copolymer which is still more excellent in performance for uses, such as detergent builders, pigment dispersants, and scale inhibitors.

In addition, another object of the present invention is to provide: a novel liquid detergent builder which has extremely excellent compatibility, high transparency when a liquid detergent composition comprises it, and very excellent detergency; and a novel liquid detergent composition comprising the liquid detergent builder.

B. Disclosure of the Invention

The present inventors diligently studied to solve the problems. As a result, they used two kinds of specific unsaturated carboxylic acid monomers, namely, used an unsaturated monocarboxylic acid monomer together with an unsaturated dicarboxylic acid monomer, and aimed at a novel trinary or quaternary or more water-soluble copolymer obtained by copolymerizing comonomers including these two kinds of unsaturated carboxylic acid monomers and a specific unsaturated alcoholic monomer. Then, they aimed at the residual amount of the raw monomers in this copolymer, and found that the copolymer can display still more excellent performance for uses, such as detergent builders, pigment dispersants, and scale inhibitors than conventional ones in case that the residual amounts of the unsaturated dicarboxylic acid monomer and the unsaturated alcoholic monomer are in the range of not more than predetermined levels. In addition, they found that the copolymer can display still more excellent performance for uses, such as detergent builders, pigment dispersants, and scale inhibitors than conventional ones in case that the clay dispersibility of the copolymer is not less than a predetermined level. The present invention was completed in this way.

The present inventors aimed at water-soluble copolymers obtained by copolymerizing comonomers including a specific unsaturated carboxylic acid monomer and a specific unsaturated alcoholic monomer. Then, they found that: the above object which could not be solved by the builder comprising the conventional unsaturated carboxylic acid (co)polymer can perfectly be solved by using the above specific water-soluble copolymers as liquid detergent builders. The present invention was completed in this way.

That is to say, a novel water-soluble copolymer, according to the present invention, is obtained by copolymerizing comonomers essentially including: an unsaturated monocarboxylic acid monomer (1) as represented by a general formula (1) below; an unsaturated dicarboxylic acid monomer (2a) as represented by a general formula (2a) below and/or an unsaturated dicarboxylic acid monomer (2b) as represented by a general formula (2b) below; and an unsaturated alcoholic monomer (3) as represented by a general formula (3) below, with the copolymer being characterized in that: the residual amount of the unsaturated dicarboxylic acid monomer is not more than 8 weight %, and the residual amount of the unsaturated alcoholic monomer is not more than 45 weight %, wherein the general formula (1) is:

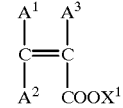

(1)

where: $A^1$, $A^2$, and $A^3$ each independently represent a hydrogen atom or a methyl group; and $X^1$ represents a hydrogen atom, a monovalent metal, a divalent metal, an ammonium group, or an organic amine group;

wherein the general formula (2a) is:

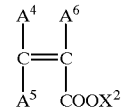

(2a)

where: $A^4$ and $A^5$ each independently represent a hydrogen atom, a methyl group, or —$COOX^3$; $A^6$ represents a hydrogen atom, a methyl group, or —$CH_2COOX^4$; only any one of $A^4$, $A^5$, and $A^6$ is —$COOX^3$ or —$CH_2COOX^4$; and $X^2$, $X^3$, and $X^4$ each independently or together represent a hydrogen atom, a monovalent metal, a divalent metal, an ammonium group, or an organic amine group;

wherein the general formula (2b) is:

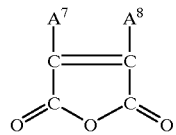
(2b)

where: $A^7$ and $A^8$ each independently represent a hydrogen atom or a methyl group; and wherein the general formula (3) is:

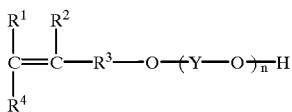
(3)

where: $R^1$, $R^2$ and $R^4$ each independently represent a hydrogen atom or a methyl group, and $R^1$ (or $R^4$) and $R^2$ are not simultaneously methyl groups; and $R^3$ represents —$CH_2$—, —$(CH_2)_2$—, or —$C(CH_3)_2$—, and the total carbon atoms contained in $R^1$, $R^2$, $R^3$ and $R^4$ is 3; Y represents an alkylene group having 2 to 18 carbon atoms; and n is an integer of 1 to 300.

In addition, another novel water-soluble copolymer, according to the present invention, is obtained by copolymerizing comonomers essentially including: an unsaturated monocarboxylic acid monomer (1) as represented by a general formula (1) below; an unsaturated dicarboxylic acid monomer (2a) as represented by a general formula (2a) below and/or an unsaturated dicarboxylic acid monomer (2b) as represented by a general formula (2b) below; and an unsaturated alcoholic monomer (3) as represented by a general formula (3) below, with the copolymer being characterized by having a clay dispersibility (50 ppm of calcium carbonate) of not less than 0.7, wherein the general formula (1) is:

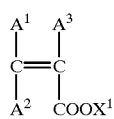
(1)

where: $A^1$, $A^2$, and $A^3$ each independently represent a hydrogen atom or a methyl group; and $X^1$ represents a hydrogen atom, a monovalent metal, a divalent metal, an ammonium group, or an organic amine group;

wherein the general formula (2a) is:

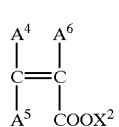
(2a)

where: $A^4$ and $A^5$ each independently represent a hydrogen atom, a methyl group, or —$COOX^3$; $A^6$ represents a hydrogen atom, a methyl group, or —$CH_2COOX^4$;

only any one of $A^4$, $A^5$, and $A^6$ is —$COOX^3$ or —$CH_2COOX^4$; and $X^2$, $X^3$, and $X^4$ each independently or together represent a hydrogen atom, a monovalent metal, a divalent metal, an ammonium group, or an organic amine group;

wherein the general formula (2b) is:

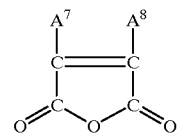
(2b)

where: $A^7$ and $A^8$ each independently represent a hydrogen atom or a methyl group; and wherein the general formula (3) is:

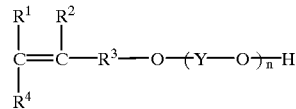
(3)

where: $R^1$, $R^2$ and $R^4$ each independently represent a hydrogen atom or a methyl group, and $R^1$ (or $R^4$) and $R^2$ are not simultaneously methyl groups; and $R^3$ represents —$CH_2$—, —$(CH_2)_2$—, or —$C(CH_3)_2$—, and the total carbon atoms contained in $R^1$, $R^2$, $R^3$ and $R^4$ is 3; Y represents an alkylene group having 2 to 18 carbon atoms; and n is an integer of 1 to 300.

In addition, a production process for a novel water-soluble copolymer essentially comprising: a constitutional unit (4) as represented by a general formula (4) below; a constitutional unit (5) as represented by a general formula (5) below; and a constitutional unit (6) as represented by a general formula (6) below, according to the present invention, is characterized by carrying out a copolymerization of comonomers essentially including: an unsaturated monocarboxylic acid monomer (1) as represented by a general formula (1) below; an unsaturated dicarboxylic acid monomer (2a) as represented by a general formula (2a) below and/or an unsaturated dicarboxylic acid monomer (2b) as represented by a general formula (2b) below; and an unsaturated alcoholic monomer (3) as represented by a general formula (3) below, wherein the general formula (4) is:

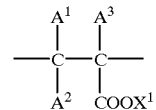
(4)

where: $A^1$, $A^2$, and $A^3$ each independently represent a hydrogen atom or a methyl group; and $X^1$ represents a hydrogen atom, a monovalent metal, a divalent metal, an ammonium group, or an organic amine group;

wherein the general formula (5) is:

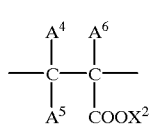
(5)

where: $A^4$ and $A^5$ each independently represent a hydrogen atom, a methyl group, or —$COOX^3$; $A^6$ represents a hydrogen atom, a methyl group, or —$CH_2COOX^4$; only any one of $A^4$, $A^5$, and $A^6$ is —$COOX^3$ or —$CH_2COOX^4$; and $X^2$, $X^3$, and $X^4$ each independently or together represent a hydrogen atom, a monovalent metal, a divalent metal, an ammonium group, or an organic amine group;

wherein the general formula (6) is:

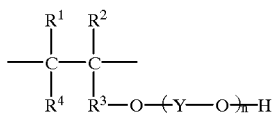
(6)

where: $R^1$, $R^2$ and $R^4$ each independently represent a hydrogen atom or a methyl group, and $R^1$ (or $R^4$) and $R^2$ are not simultaneously methyl groups; and $R^3$ represents —$CH_2$—, —$(CH_2)_2$—, or —$C(CH_3)_2$—, and the total carbon atoms contained in $R^1$, $R^2$, $R^3$ and $R^4$ is 3; Y represents an alkylene group having 2 to 18 carbon atoms; and n is an integer of 1 to 300;

wherein the general formula (1) is:

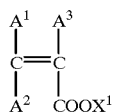
(1)

where: $A^1$, $A^2$, and $A^3$ each independently represent a hydrogen atom or a methyl group; and $X^1$ represents a hydrogen atom, a monovalent metal, a divalent metal, an ammonium group, or an organic amine group;

wherein the general formula (2a) is:

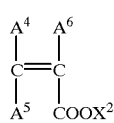
(2a)

where: $A^4$ and $A^5$ each independently represent a hydrogen atom, a methyl group, or —$COOX^3$; $A^6$ represents a hydrogen atom, a methyl group, or —$CH_2COOX^4$; only any one of $A^4$, $A^5$, and $A^6$ is —$COOX^3$ or —$CH_2COOX^4$; and $X^2$, $X^3$, and $X^4$ each independently or together represent a hydrogen atom, a monovalent metal, a divalent metal, an ammonium group, or an organic amine group;

wherein the general formula (2b) is:

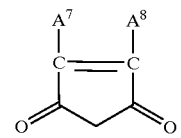
(2b)

where: $A^7$ and $A^8$ each independently represent a hydrogen atom or a methyl group; and wherein the general formula (3) is:

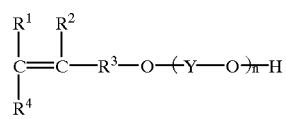
(3)

where: $R^1$, $R^2$ and $R^4$ each independently represent a hydrogen atom or a methyl group, and $R^1$ (or $R^4$) and $R^2$ are not simultaneously methyl groups; and $R^3$ represents —$CH_2$—, —$(CH_2)_2$—, or —$C(CH_3)_2$—, and the total carbon atoms contained in $R^1$, $R^2$, $R^3$ and $R^4$ is 3; Y represents an alkylene group having 2 to 18 carbon atoms; and n is an integer of 1 to 300.

Furthermore, a detergent builder, according to the present invention, is characterized by essentially including the novel water-soluble copolymer according to the present invention. In addition, a detergent composition, according to the present invention, is characterized by comprising the detergent builder according to the present invention.

In addition, a pigment dispersant, according to the present invention, is characterized by essentially comprising the novel water-soluble copolymer according to the present invention.

Furthermore, a scale inhibitor, according to the present invention, is characterized by essentially comprising the novel water-soluble copolymer according to the present invention.

Furthermore, a liquid detergent builder, according to the present invention, comprises a water-soluble copolymer obtained by copolymerizing comonomers essentially including an unsaturated carboxylic acid monomer (a) and an unsaturated alcoholic monomer as represented by general formula (3) below, wherein the unsaturated carboxylic acid monomer (a) is any one of an unsaturated monocarboxylic acid monomer (1) as represented by a general formula (1) below, an unsaturated dicarboxylic acid monomer (2a) as represented by a general formula (2a) below, and an unsaturated dicarboxylic acid monomer (2b) as represented by a general formula (2b) below, wherein the general formula (1) is:

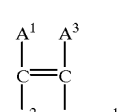
(1)

where: $A^1$, $A^2$, and $A^3$ each independently represent a hydrogen atom or a methyl group; and $X^1$ represents a hydrogen atom, a monovalent metal, a divalent metal, an ammonium group, or an organic amine group;

where the general formula (2a) is:

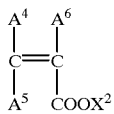

(2a)

where $A^4$ and $A^5$ each independently represent a hydrogen atom, a methyl group, or —$COOX^3$; $A^6$ represents a hydrogen atom, a methyl group, or —$CH_2COOX^4$; only any one of $A^4$, $A^5$, and $A^6$ is —$COOX^3$ or —$CH_2COOX^4$; and $X^2$, $X^3$, and $X^4$ each independently or together represent a hydrogen atom, a monovalent metal, a divalent metal, an ammonium group, or an organic amine group;

wherein the general formula (2b) is:

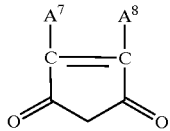

(2b)

where: $A^7$ and $A^8$ each independently represent a hydrogen atom or a methyl group; and wherein the general formula (3) is:

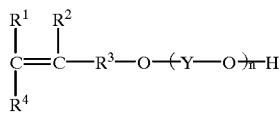

(3)

where: $R^1$, $R^2$ and $R^4$ each independently represent a hydrogen atom or a methyl group, and $R^1$ (or $R^1$) and $R^1$ are not simultaneously methyl groups; and $R^3$ represents —$CH_2$—, —$(CH_2)_2$—, or —$C(CH_3)_2$—, and the total carbon atoms contained in $R^1$, $R^2$, $R^3$ and $R^4$ is 3; Y represents an alkylene group having 2 to 18 carbon atoms; and n is an integer of 1 to 300.

In addition, a liquid detergent composition, according to the present invention, comprises the liquid detergent builder according to the present invention.

These and other objects and the advantages of the present invention will be more fully apparent from the following detailed disclosure.

DETAILED DESCRIPTION OF THE INVENTION

[Novel Water-Soluble Copolymer]

The unsaturated monocarboxylic acid monomer (1) which can be used in the present invention is not especially limited if it can be represented by the general formula (1). Examples thereof include: acrylic acid, methacrylic acid, crotonic acid, their monovalent metal salts, or partially or completely neutralized products with ammonia or organic amines.

The unsaturated dicarboxylic acid monomer (2a) or (2b) which can be used in the present invention is not especially limited in the present invention if it can be represented by the general formula (2a) or (2b). Examples of the monomer which can be represented by the general formula (2a) includes: maleic acid, fumaric acid, crotonic acid, citraconic acid, their monovalent metal salts, or partially or completely neutralized products with ammonia or organic amines. In addition, examples of the monomer which can be represented by the general formula (2b) include: unsaturated dicarboxylic acid anhydride monomers such as maleic anhydride or citraconic anhydride, but are not especially limited to these.

The unsaturated alcoholic monomer (3) which can be used in the present invention is not especially limited if it can be represented by the general formula (3). Examples thereof includes: compounds obtained by adding 1 to 300 moles (preferably 1 to 100 moles, more preferably 5 to 50 moles) of an alkylene oxide having 2 to 18 carbon atoms to 1 mol of unsaturated alcohols, such as 3-methyl-3-buten-1-ol, 3-methyl-2-buten-1-ol, or 2-methyl-3-buten-2-ol. Examples of the alkylene oxide having 2 to 18 carbon atoms include: styrene oxide, ethylene oxide, and propylene oxide. The ethylene oxide and/or propylene oxide is preferably used. When the ethylene oxide is combined with the propylene oxide, the combining turn is not limited.

In case where the addition number of moles of the ethylene oxide and/or propylene oxide is 0, the effects of the present invention cannot be displayed enough. In addition, in case where the addition number exceeds 300, there are disadvantages in that the effects of the present invention is not improved, and it is merely necessary to add too much.

The novel water-soluble copolymer according to the present invention is obtained by copolymerizing comonomers essentially including the unsaturated monocarboxylic acid monomer (1), the unsaturated dicarboxylic acid monomer (2a) and/or (2b), and the unsaturated alcoholic monomer (3). However, the comonomers may include other copolymerizable monomers with the monomers (1) to (3) in addition to the monomers (1) to (3).

The other monomers are not especially limited, but examples thereof include: styrene; styrenesulfonic acid; vinyl acetate; (meth)acrylonitrile; (meth)acrylamide; methyl (meth)acrylate; ethyl (meth)acrylate; butyl (meth)acrylate; 2-ethylhexyl (meth)acrylate; dimethylamino (meth)acrylate; diethylamino (meth)acrylate; allyl alcohol; 3-methyl-3-buten-1-ol; 3-methyl-2-buten-1-ol; 2-methyl-3-buten-2-ol; 3-(meth)acryloxy-1,2-dihydroxypropane; 3-(meth)acryloxy-1,2-di(poly)oxyethylene ether propane; 3-(meth)acryloxy-1,2-di(poly)oxypropylene ether propane; 3-(meth)acryloxy-1,2-dihydroxypropanesulfate, and its monovalent metal salts, divalent metal salts, ammonium salts, and organic amine salts, or its mono- or di-ester of alkyl groups having 1 to 4 carbon atoms; 3-(meth)acryloxy-1,2-dihydroxypropanesulfonic acid, and its monovalent metal salts, divalent metal salts, ammonium salts, and organic amine salts, or its mono- or di-ester of alkyl groups having 1 to 4 carbon atoms; 3-(meth)acryloxy-2-(poly)oxyethylene ether propanesulfonic acid, and its monovalent metal salts, divalent metal salts, ammonium salts, and organic amine salts, or its mono- or di-ester of alkyl groups having 1 to 4 carbon atoms; 3-(meth)acryloxy-2-(poly)oxypropylene ether propanesulfonic acid, and its monovalent metal salts, divalent metal salts, ammonium salts, or organic amine salts, or its mono- or di-ester of alkyl groups having 1 to 4 carbon atoms; 3-allyloxypropane-1,2-diol; 3-allyloxypropane-1,2-diol phosphate; 3-allyloxypropane-1,2-diol sulfonate; 3-allyloxypropane-1,2-diol sulfate; 3-allyloxypropane-1,2-di(poly)oxyethylene ether propane; 3-allyloxypropane-1,2-di(poly)oxyethylene ether propanephosphate; 3-allyloxypropane-1,2-di(poly)oxyethylene ether propanesulfonate; 3-allyloxypropane-1,2-di(poly)oxypropylene ether propane; 3-allyloxypropane-1,2-di(poly)oxypropylene ether propanephosphate; 3-allyloxypropane-1,2-di(poly)

oxypropylene ether propanesulfonate; 6-allyoxyhexane-1,2, 3,4,5-pentaol; 6-allyoxyhexane-1,2,3,4,5-pentaolphosphate; 6-allyoxyhexane-1,2,3,4,5-pentaolsulfonate; 6-allyoxyhexane-1,2,3,4,5-penta(poly)oxyethylene ether hexane; 6-allyoxyhexane-1,2,3,4,5-penta(poly) oxypropylene ether hexane; 3-allyoxy-2-hydroxypropanesulfonic acid, and its monovalent metal salts, divalent metal salts, ammonium salts, or organic amine salts, or their phosphates or sulfonates, or their monovalent metal salts, divalent metal salts, ammonium salts, or organic amine salts; 3-allyoxy-2-(poly)oxyethylene propanesulfonic acid, and its monovalent metal salts, divalent metal salts, ammonium salts, or organic amine salts, or their phosphates or sulfonates, or their monovalent metal salts, divalent metal salts, ammonium salts, or organic amine salts; and 3-allyoxy-2-(poly)oxypropylene propanesulfonic acid, and its monovalent metal salts, divalent metal salts, ammonium salts, or organic amine salts, or their phosphates or sulfonates, or their monovalent metal salts, divalent metal salts, ammonium salts, or organic amine salts.

The novel water-soluble copolymer in the present invention is obtained by carrying out a copolymerization of comonomers essentially including the unsaturated monocarboxylic acid monomer (1), the unsaturated dicarboxylic acid monomer (2a) and/or (2b), and the unsaturated alcoholic monomer (3). The method for the copolymerization is not especially limited. For example, the copolymerization can be carried out by conventional methods. Examples thereof include a polymerization in solvents such as water, organic solvents, or solvents mixed with water-soluble organic solvents and water. Usable catalyst systems in these polymerizations are not especially limited. Examples thereof include persulfates or hydrogen peroxide, and they can be used together with promoters such as hydrogen sulfrates and ascorbic acid. Besides, azo initiators or organic peroxides can be used and promoters such as amine compounds can be used together. The catalyst system using ascorbic acid together with hydrogen peroxide is preferable because of carrying out the reaction favorably. In addition, the catalyst system using hydrogen peroxide together with at least one metal ion selecting from the group consisting of an iron ion, an ion including vanadium, and a copper ion is more preferable. In addition, chain transfer agents such as mercaptoethanol, mercaptopropionic acid, and hypophosphorous acid sodium salt can be used together as an agent for adjusting molecular weight.

When copolymerizing the comonomers essentially including the unsaturated monocarboxylic acid monomer (1), the unsaturated dicarboxylic acid monomer (2a) and/or (2b), and the unsaturated alcoholic monomer (3) in order to obtain the novel water-soluble copolymer according to the present invention, the ratio of each monomer (monomers (1) to (3), and the above other monomers if necessary) is not especially limited because the ratio can be varied due to the use of the copolymer. For example, the ratio of the total of the unsaturated monocarboxylic acid monomer and the unsaturated dicarboxylic acid monomer is preferably not less than 5 weight %, more preferably 20 weight %, still more preferably 30 weight %. In addition, the ratio is preferably not less than 50 weight % when the chelating ability is more highly requested.

In addition, the ratio between the unsaturated monocarboxylic acid monomer and the unsaturated dicarboxylic acid monomer is not especially limited, but the ratio is preferably in the range of (1 to 99)/(99 to 1) (weight ratio) as the unsaturated monocarboxylic acid monomer/the unsaturated dicarboxylic acid monomer, more preferably (20 to 90)/(80 to 10), still more preferably (50 to 90)/(50 to 10).

In addition, the ratio of the unsaturated alcoholic monomer is also not especially limited, but the ratio is preferably not less than 5 weight %, more preferably 20 weight %, still more preferably 40 weight %. In addition, the ratio is preferably not less than 50 weight % when the compatibility with such as liquid detergents is needed.

The novel water-soluble copolymer according to the present invention is a novel copolymer obtained by copolymerizing the comonomers essentially including the unsaturated monocarboxylic acid monomer (1), the unsaturated dicarboxylic acid monomer (2a) and/or (2b), and the unsaturated alcoholic monomer (3) in the above way, but the copolymer is further characterized in that: the residual amount of the unsaturated dicarboxylic acid monomer is not more than 8 weight %, and the residual amount of the unsaturated alcoholic monomer is not more than 45 weight %. When the residual amounts of the unsaturated dicarboxylic acid monomer and the unsaturated alcoholic monomer are in the above level, the copolymer can display still more excellent performance for uses, such as detergent builders, pigment dispersants, and scale inhibitors than conventional ones.

The residual amount of the unsaturated dicarboxylic acid monomer is preferably not more than 5 weight %, more preferably not more than 2 weight %.

The residual amount of the unsaturated alcoholic monomer is preferably not more than 20 weight %, more preferably not more than 10 weight %, still more preferably not more than 5 weight %.

In case where the residual amount of the unsaturated dicarboxylic acid monomer is more than 8 weight %, there are disadvantages in safety. In addition, the chelating ability and dispersibility are lowered because the content of the carboxylic acid is decreased in the copolymer. In addition, when the copolymer is used in an aqueous state, there are disadvantages in that the residual unsaturated dicarboxylic acid monomer may be insoluble depending on pH of the liquid.

In case where the residual amount of the unsaturated alcoholic monomer is more than 45 weight %, the performance such as dispersibility and compatibility with liquid detergents is lowered because the effective content is decreased in the copolymer. In addition, there are disadvantages in that the copolymer can be changed with the passage of time because the unsaturated alcoholic monomer is reactive.

Another novel water-soluble copolymer, according to the present invention, is a novel copolymer obtained by copolymerizing the comonomers essentially including the unsaturated monocarboxylic acid monomer (1), the unsaturated dicarboxylic acid monomer (2a) and/or (2b), and the unsaturated alcoholic monomer (3) in the above way, but the copolymer is further characterized by having a clay dispersibility (50 ppm of calcium carbonate) of not less than 0.7. When the clay dispersibility (50 ppm of calcium carbonate) is not less than 0.7, the copolymer can display still more excellent performance for uses, such as detergent builders, pigment dispersants, and scale inhibitors than conventional ones.

The clay dispersibility (50 ppm of calcium carbonate) is preferably not less than 0.8, more preferably not less than 0.9, still more preferably not less than 1.0.

The novel water-soluble copolymer according to the present invention can be used for the following various uses by itself. However, the copolymer can be used after neutralizing it with an alkaline substance if necessary. Examples of such an alkaline substance include: hydroxides, chlorides, or carbonates of monovalent or divalent metals; ammonia; and organic amines.

The novel water-soluble copolymer according to the present invention can be used for various uses including the following major uses. Examples thereof include water slurry dispersants for inorganic pigments, cement additives, scale inhibitors, detergent builders, deinking agents of waste paper, chelating agents, various dye dispersants, dispersants for agricultural chemicals, cotton scouring-washing agents, and coal dispersants.

The novel water-soluble copolymer, according to the present invention, is a copolymer having excellent clay dispersibility (50 ppm of calcium carbonate) due to the specific copolymerization structure and the residual amount of the monomers in not more than the predetermined level. The clay dispersibility (50 ppm of calcium carbonate) is preferably not less than 0.3, more preferably not less than 0.5, still more preferably not less than 0.7, particularly preferably not less than 0.9.

The novel water-soluble copolymer, according to the present invention, is a copolymer having excellent calcium ion scavengeability due to the specific copolymerization structure and the residual amount of the monomers in not more than the predetermined level. The calcium ion scavengeability is preferably not less than 60 mg/g, more preferably not less than 100 mg/g, still more preferably not less than 130 mg/g, particularly preferably not less than 170 mg/g.

[Production Process for the Novel Water-Soluble Copolymer]

The production process for the novel water-soluble copolymer, according to the present invention, is a production process for the novel water-soluble copolymer essentially comprises a constitutional unit (4), a constitutional unit (5) and a constitutional unit (6) as mentioned above, and is characterized by carrying out a copolymerization of comonomers essentially including the unsaturated monocarboxylic acid monomer (1), the unsaturated dicarboxylic acid monomer (2a) and/or (2b), and the unsaturated alcoholic monomer.

The method for the copolymerization is not especially limited. For example, the copolymerization can be carried out by conventional methods. Examples thereof include a polymerization in solvents such as water, organic solvents, or solvents mixed with water-soluble organic solvents and water. Usable catalyst systems in these polymerizations are not especially limited. Examples thereof include persulfates or hydrogen peroxide, and they can be used together with promoters such as hydrogen sulfates and ascorbic acid. Besides, azo initiators or organic peroxides can be used and promoters such as amine compounds can be used together. The catalyst system using ascorbic acid together with hydrogen peroxide is preferable because of carrying out the reaction favorably. In addition, the catalyst system using hydrogen peroxide together with at least one metal ion selecting from the group consisting of an iron ion, an ion including vanadium, and a copper ion is more preferable.

[Detergent Builder and Detergent Composition]

The detergent builder according to the present invention is characterized by essentially including the novel water-soluble copolymer according to the present invention.

For example, the detergent builder according to the present invention may consist of the novel water-soluble copolymer according to the present invention, or may be used together with other conventional detergent builders. In addition, the novel water-soluble copolymer as used for the detergent builder according to the present invention may be a product further neutralized with the alkaline substance in the above way if necessary.

Examples of the above other detergent builders include: sodium tripolyphosphate, sodium pyrophosphorate, sodium silicate, sodium sulfate, sodium carbonate, sodium nitrirotriacetate, sodium or potassium ethylenediaminetetraacetate, zeolite, carboxyl derivatives of polysaccharide, water-soluble polymers such as (meth) acrylic acid (co)polymer salts and fumaric acid (co)polymer salts.

The detergent builder according to the present invention may be used for liquid detergents or powdery detergents. However, if the detergent builder is used for liquid detergent compositions, there are advantages in that: the detergent builder has excellent compatibility with the following surfactants, and the liquid detergent compositions are concentrated.

The detergent composition according to the present invention is characterized by comprising the detergent builder essentially including the novel water-soluble copolymer according to the present invention.

The detergent composition according to the present invention usually comprises a detergent surfactant in addition to the novel water-soluble copolymer according to the present invention.

The surfactant is at least one type selected from the group consisting of anionic surfactants, nonionic surfactants, cationic surfactants, and amphoteric surfactants. These surfactants may be used either alone respectively or in combinations of each other.

Examples of the anionic surfactant are alkylbenzenesulfonic acid salts, alkyl or alkenyl ether sulfuric acid salts, alkyl- or alkenylsulfuric acid salts, α-olefinsulfonic acid salts, α-sulfofatty acids or ester salts thereof, alkanesulfonic acid salts, saturated or unsaturated fatty acid salts, alkyl or alkenyl ether carboxylic acid salts, amino acid type surfactants, N-acylamino acid type surfactants, alkyl- or alkenylphosphoric acid esters or salts thereof.

Examples of the nonionic surfactant are polyoxyalkylene alkyl or alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, alkylamine oxides.

Examples of the cationic surfactant thereof are quaternary ammonium salts.

Examples of the amphoteric surfactant are carboxyl type or sulfobetaine type amphoteric surfactants.

The content of the surfactant as contained in the detergent composition is usually in a range of 10 to 60 weight %, preferably, 15 to 50 weight %, of the liquid detergent composition. In the case where the content of the surfactant is less than 10 weight %, the sufficient washability cannot be displayed. On the other hand, in the case where the content of the surfactant is more than 60 weight %, the economic advantage is lowered.

The content of the present invention detergent builder as contained in the detergent composition is usually in a range of 0.1 to 60 weight %, preferably, 3 to 30 weight %, of the detergent composition. In the case where the content of the detergent builder is less than 0.1 weight %, the sufficient washability cannot be displayed. On the other hand, in the case where the content of the detergent builder is more than 60 weight %, the economic advantage is lowered.

Various additives which are usually used for detergents can be added to the detergent composition according to the present invention. Examples thereof include: sodium carboxymethyl cellulose for inhibiting reattachment of contaminations, contamination inhibitors such as benzotriazole and ethylene-thiourea, alkaline substances for adjusting pH, perfumes, fluorescent agents, colorants, foaming agents, foaming stabilizers, polishing agents, sterilizers, bleachers, enzymes, dyes, and solvents.

The detergent composition according to the present invention may be used for liquid detergents or powdery detergents. However, if the detergent builder is used for the liquid detergent compositions, there are advantages in that: the detergent builder has excellent compatibility with the following surfactants, and the liquid detergent compositions are concentrated.

[Pigment Dispersant]

The pigment dispersant according to the present invention is characterized by essentially comprising the novel water-soluble copolymer according to the present invention.

The pigment dispersant according to the present invention can be used for dispersing pigments, such as kaolin, clay, calcium carbonate, titanium dioxide, barium sulfate, satin white, and magnesium hydroxide, into water.

The ratio of the pigment dispersant to the pigment is preferably in the range of 0.01 to 3.0 parts by weight of 100 parts by weight of the pigment.

The pigment dispersant according to the present invention has excellent dispersibility and low viscosity even in a high concentration, and enables to produce a dispersing liquid having excellent stability because of essentially comprising the novel water-soluble copolymer according to the present invention. Therefore, the pigment dispersant not only can particularly preferably be used as a dispersant in order to disperse pigments for paper, but also can widely be applied to fields such as fiber processing, building materials processing, paints, and ceramic industries.

[Scale Inhibitor]

The scale inhibitor according to the present invention is characterized by essentially comprising the novel water-soluble copolymer according to the present invention.

For example, the scale inhibitor according to the present invention may consist of the novel water-soluble copolymer according to the present invention, or can be combined with other additives which are used in this technical field. In addition, the novel water-soluble copolymer as used for the scale inhibitor according to the present invention may further be neutralized with alkaline substances if necessary.

The other additives are not especially limited, but the scale inhibitor can be used as a water-treating agent composition by combining with anticorrosive agents such as polymerized phosphoric acid salts, phosphoric acid salts, phosphonic acid salts, zinc salts, and molybdates. In addition, the scale inhibitor can be combined with slime controlling agents or chelating agents if necessary.

The scale inhibitor according to the present invention can be used in the same way as of conventional scale inhibitors, by such as definite or intermittent injection in order to adjust constant concentration in circulating water. When the amount as added is generally in the range of 1 to 50 ppm, the sufficient effects are observed. However, the amount is not limited to the above range.

[Liquid Detergent Builder]

The liquid detergent builder according to the present invention is characterized by including the water-soluble copolymer as an essential component. The water-soluble copolymer obtained by copolymerizing comonomers essentially including an unsaturated carboxylic acid monomer (a) and an unsaturated alcoholic monomer (3), wherein the unsaturated carboxylic acid monomer (a) is any one of an unsaturated monocarboxylic acid monomer (1), an unsaturated dicarboxylic acid monomer (2a), and an unsaturated dicarboxylic acid monomer (2b).

Preferred modes for the water-soluble copolymer are fundamentally the same as of the above water-soluble copolymer according to the present invention. However, when copolymerizing the comonomers essentially including the unsaturated carboxylic acid monomer (a) and the unsaturated alcoholic monomer (3) in order to obtain the water-soluble copolymer in the present invention, the ratio between the monomer (a) and the monomer (3) each in the comonomers is in the range of (5 to 95)/(95 to 5) (weight ratio) as the monomer (a)/the monomer (3). The ratio is preferably in the range of (10 to 70)/(90 to 30), more preferably (20 to 60)/(80 to 40). In case where the ratio of the monomer (a) is less than 5, the chelating ability is lowered. On the other hand, in case where the ratio of the monomer (3) is less than 5, the scale resistance which is an effect of introducing polyethylene glycol chains is lowered.

For example, the liquid detergent builder according to the present invention may consist of the above water-soluble copolymer, or may be used together with other conventional detergent builders. In addition, the water-soluble copolymer as used for the liquid detergent builder according to the present invention may be a product further neutralized with the alkaline substance in the above way if necessary.

Examples of the above other detergent builders include: sodium tripolyphosphate, sodium pyrophosphorate, sodium silicate, sodium sulfate, sodium carbonate, sodium nitrirotriacetate, sodium or potassium ethylenediaminetetraacetate, zeolite, carboxyl derivatives of polysaccharide, water-soluble polymers such as (meth) acrylic acid (co)polymer salts and fumaric acid (co)polymer salts.

When the liquid detergent builder according to the present invention is used for the following liquid detergent composition, the builder is very excellent for a liquid detergent because it has excellent compatibility with surfactants and the liquid detergent composition is concentrated. The transparency of the liquid detergent composition is good and the problem of separating liquid detergents due to muddiness can be prohibited because the builder has excellent compatibility with surfactants. Then, the excellent compatibility can make a concentrated liquid detergent composition, and leads the improvement of detergency of the liquid detergent.

The liquid detergent builder according to the present invention is a copolymer having an excellent clay dispersibility (50 ppm of calcium carbonate) of not less than 0.3, preferably not less than 0.5, more preferably not less than 0.7, particularly preferably not less than 0.9, because it comprises the above specific water-soluble copolymer. In case where the builder has a clay dispersibility (50 ppm of calcium carbonate) of less than 0.3 and used as a liquid detergent builder, there are disadvantages in that the effects of improving detergency against mud dirt are particularly lowered.

[Liquid Detergent Composition]

The liquid detergent composition according to the present invention is characterized by comprising the liquid detergent builder according to the present invention.

Because the present invention liquid detergent builder comprised in the present invention liquid detergent composition has excellent compatibility with surfactants, the transparency of the liquid detergent composition is good and the problem of separating liquid detergents due to muddiness can be prohibited. Then, the excellent compatibility can make a concentrated liquid detergent composition, and leads the improvement of detergency of the liquid detergent.

The turbidity (kaolin turbidity) measured with a turbidmeter is useful as one of scales which represent excellent compatibility. The turbidity value of the liquid detergent composition according to the present invention is preferably not more than 200 mg/l at 25° C., more preferably not less than 100 mg/l, still more preferably not less than 50 mg/l.

The liquid detergent composition according to the present invention can display excellent detergency in comparison with conventional liquid detergent compositions because it comprises the liquid detergent builder which can give excellent detergency.

The liquid detergent composition according to the present invention usually comprises a detergent surfactant in addition to the liquid detergent builder according to the present invention. The detergent surfactants as mentioned above can be used.

The combining ratio of the surfactant and the detergent builder in the liquid detergent composition according to the present invention, and additives which can be added are in the same as of the above detergent composition according to the present invention.

(Effects and Advantages of the Invention):

The present invention can provide: a novel water-soluble copolymer which is still more excellent in performance for uses, such as detergent builders, pigment dispersants, and scale inhibitors.

The present invention can provide: a novel liquid detergent builder which has extremely excellent compatibility, high transparency when a liquid detergent composition comprises it, and very excellent detergency; and a novel liquid detergent composition comprising the liquid detergent builder.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

Incidentally, the weight-average molecular weight of the polymer as obtained in the following examples or comparative examples was measured in the following way.

| (Measurement of weight-average molecular weight (GPC analysis)) | |
|---|---|
| Instrument: | L-7000 series made by Hitachi |
| Detector: | RI |
| Columns: | SB-G, SB-804, SB-803, SB-802.5 made by SHODEX |
| Columns temperature: | 40° C. |
| Calibration curve: | POLYACRYLIC ACID STANDARD made by Sowa Kagaku Co., Ltd. |
| GPC software: | BORWIN made by Nippon Bunko |
| Eluent: | 0.1N phosphoric acid buffer (pH 8.0)/ acetonitrile = 9/1 (weight ratio) |

(Measurement of Solid Content)

The solid content denoted nonvolatile content obtained by drying with hot-blow dryer at 110° C. for 2 hours.

(Measurement of Acid Value)

The acid value was measured by a titration using an aqueous sodium hydroxide solution of 1 N. When the copolymer was not in an acid form, the acid value was measured by a back titration using an aqueous hydrogen chloride solution of 1 N.

| (Measurement method for residual amount of monomer (LC analysis)) | |
|---|---|
| Instrument: | LC Module 1 plus made by Waters |
| Detector: | UV (wavelength: 254 nm) (maleic acid, acrylic acid, and methacrylic acid) RI |
| Columns: | Inertsil made by GL Science ODS-2 (4.6 mm × 50 mm) 1 piece, and ODS-2 (4.6 mm × 250 mm) 3 pieces |
| Columns temperature: | 35° C. |
| Eluent: | acetonitrile/0.1N acetic acid buffer (pH = 4.0) = 4/6 (weight ratio) |

EXAMPLE A1

A separable flask of 200 ml in capacity with a stirrer, a condenser, a thermometer, a nitrogen introducing tube, and a dropping funnel was charged with 9.6 g of maleic anhydride and 20 g of pure water, and the atmosphere of the flask was replaced with nitrogen. Thereafter, the resultant mixture was heated to 65° C. while being stirred. When the temperature reached 65° C., 1.43 g of aqueous hydrogen peroxide solution of 35% was collectively added thereto.

Next, a solution obtained by dissolving 10 g of unsaturated alcohol (produced by an addition reaction of 10 mols of ethylene oxide to 3-methyl-2-buten-1-ol, hereinafter, referred as IPN-10) with 31.4 g of pure water, and a solution obtained by dissolving 10 g of acrylic acid of 100% and 0.64 g of L-ascorbic acid with 10 g of pure water were separately added thereto over a period of 60 minutes. After the addition of the solutions, the resultant reaction mixture was aged at the same temperature for an hour to complete the polymerization, thus obtaining a novel copolymer A1. The analytical results of the novel copolymer 1 as obtained were listed in Table 1.

EXAMPLE A2

The polymerization was carried out in the same way as of Example A1 except that the polymerization temperature was changed to 90° C. The analytical results of a novel copolymer A2 as obtained were listed in Table 1.

EXAMPLE A3

A separable flask of 200 ml in capacity with a stirrer, a condenser, a thermometer, a nitrogen introducing tube, and a dropping funnel was charged with 11.24 g of maleic anhydride and 18.46 g of pure water, and the atmosphere of the flask was replaced with nitrogen. Thereafter, the resultant mixture was heated to 80° C. while being stirred. When the temperature reached 80° C., 2.8 g of aqueous hydrogen peroxide solution of 35% was collectively added thereto. Thereafter, the temperature was raised further, and the resultant mixture was heated to fall into a reflux state (about 103° C.).

Next, a solution obtained by dissolving 30 g of IPN-10 with 30 g of pure water, and a solution obtained by dissolving 20 g of acrylic acid of 100% and 0.979 g of L-ascorbic acid with 9.5 g of pure water were separately added thereto over a period of 60 minutes. After the addition of the solutions, the resultant reaction mixture was aged at the same temperature for an hour to complete the polymerization, thus obtaining a novel copolymer A3. The analytical results of the novel copolymer A3 as obtained were listed in Table 1.

EXAMPLE A4

The polymerization was carried out in the same way as of Example A1 except that the polymerization temperature was changed to 90° C., and 13.5 g of aqueous sodium hydroxide solution of 48% was added to maleic acid. The analytical results of a novel copolymer A4 as obtained were listed in Table 1.

EXAMPLE A5

A separable flask of 300 ml in capacity with a stirrer, a condenser, a thermometer, a nitrogen introducing tube, and a dropping funnel was charged with 16.35 g of maleic anhydride, 45.2 g of pure water and 0.007 g of Mohr's salt, and the atmosphere of the flask was replaced with nitrogen. Thereafter, the resultant mixture was heated to the temperature (about 103° C.) at which the mixture is refluxed while being stirred. When the temperature reached a predetermined one, a solution obtained by adding 20 g of pure water to 50 g of IPN-10, 43.0 g of aqueous acrylic acid solution of 80%, and a solution obtained by adding 30 g of pure water to 4.80 g of aqueous hydrogen peroxide solution of 35% were separately dropwise added thereto over a period of 120 minutes. After the addition of the solutions, the resultant reaction mixture was aged at the refluxing temperature for an hour to complete the polymerization, thus obtaining a novel copolymer A5. The analytical results of a novel copolymer A5 as obtained were listed in Table 1.

EXAMPLE A6

The polymerization was carried out in the same way as of Example A5 except for changing the amount of each monomer and catalyst as introduced into the following way. First, 20.4 g of pure water was dissolved in 9.07 g of aqueous hydrogen peroxide solution, and 14.58 g of maleic anhydride was dissolved in 43 g of pure water. The amounts of aqueous acrylic acid solution of 80% and Mohr's salt were changed into 20.1 g and 0.004 g respectively. The analytical results of a novel copolymer A6 as obtained were listed in Table 1.

EXAMPLE A7

The polymerization was carried out in the same way as of Example A5 except for changing the amount of each monomer and catalyst as introduced into the following way. First, 28 g of pure water was dissolved in 70 g of IPN-10, 20.4 g of pure water was dissolved in 7.96 g of aqueous hydrogen peroxide solution, and 4.88 g of maleic anhydride was dissolved in 24 g of pure water. The amounts of aqueous acrylic acid solution of 80% and Mohr's salt were changed into 20.1 g and 0.004 g respectively. The analytical results of a novel copolymer A7 as obtained were listed in Table 1.

EXAMPLES A8 to A16

The polymerizations were carried out in the same way as of Example A5 except for changing the amount of the monomers as introduced and the amount of the initiator as listed in Table 1. However, the acrylic acid was replaced with methacrylic acid in Examples A10 to A11. The analytical results of novel copolymers A8 to A16 as obtained were listed in Table 2.

EXAMPLE A17

A separable flask of 300 ml in capacity with a stirrer, a condenser, a thermometer, a nitrogen introducing tube, and a dropping funnel was charged with 50 g of IPN-10 and 20 g of pure water, and the atmosphere of the flask was replaced with nitrogen for one hour. Thereafter, the resultant mixture was heated to 95° C. while being stirred. When the temperature reached 95° C., a solution obtained by dissolving 3.86 g of maleic anhydride and 1.03 g of ammonium persulfate with 11.37 g of pure water, and 5.31 g of aqueous acrylic acid solution of 80% were dropwise added thereto over a period of 120 minutes. After the addition of the solutions, the resultant reaction mixture was aged at the refluxing temperature for an hour to complete the polymerization, thus obtaining a novel copolymer A17. The analytical results of the novel copolymer A17 as obtained were listed in Table 2.

Comparative Example A1

A separable flask of 500 ml in capacity with a stirrer, a condenser, a thermometer, a nitrogen introducing tube, and a dropping funnel was charged with 100 g of IPN-10 and 46.4 g of pure water, and the atmosphere of the flask was replaced with nitrogen for one hour. Thereafter, the resultant mixture was heated to 95° C. while being stirred. When the temperature reached 95° C., a solution obtained by dissolving 37.2 g of maleic anhydride and 2.67 g of ammonium persulfate with 92.8 g of pure water, and 34 g of aqueous acrylic acid solution of 80% were dropwise added thereto over a period of 120 minutes. After the addition of the solutions, 3.1 g of aqueous ammonium persulfate solution of 7% was dropwise added thereto over a period of 10 minutes, and the resultant reaction mixture was aged at the same temperature for 50 minutes to complete the polymerization.

However, the copolymer as obtained was a gel, and not a water-soluble polymer.

Comparative Example A2

A separable flask of 500 ml in capacity with a stirrer, a condenser, a thermometer, a nitrogen introducing tube, and a dropping funnel was charged with 70 g of IPN-10 and 81.4 g of pure water, and the atmosphere of the flask was replaced with nitrogen for one hour. Thereafter, the resultant mixture was heated to 95° C. while being stirred. When the temperature reached 95° C., a solution obtained by dissolving 26.0 g of maleic anhydride and 3.74 g of ammonium persulfate with 81.4 g of pure water, and 23.8 g of aqueous acrylic acid solution of 80% were dropwise added thereto over a period of 120 minutes. After the addition of the solutions, 13.4 g of aqueous ammonium persulfate solution of 7% was dropwise added thereto over a period of 60 minutes. The analytical results of a comparative copolymer A1 as obtained were listed in Table 2.

Comparative Example A3

A separable flask of 500 ml in capacity with a stirrer, a condenser, a thermometer, a nitrogen introducing tube, and a dropping funnel was charged with 200 g of IPN-10 and 56.9 g of pure water, and the atmosphere of the flask was replaced with nitrogen for one hour. Thereafter, the resultant mixture was heated to 95° C. while being stirred. When the temperature reached 95° C., a solution obtained by dissolving 8.0 g of maleic anhydride and 3.36 g of ammonium persulfate with 39.7 g of pure water, and a solution obtained by adding 17.2 g of pure water to 7.3 g of aqueous acrylic acid solution of 80% were dropwise added thereto over a period of 120 minutes. After the addition of the solutions, 23.9 g of aqueous ammonium persulfate solution of 7% was dropwise added thereto over a period of 60 minutes. The analytical results of a comparative copolymer A2 as obtained were listed in Table 2.

TABLE 1

| Water-soluble copolymer | AL monomer/DCA monomer/CA (Introducing ratio, weight ratio) | Addition number of moles of EO to AL monomer | Residual amount of monomer (weight %) AL monomer | DCA monomer | CA monomer | Solid Content (%) | pH | Acid Value (meq/g) | Molecular weight (Mw) |
|---|---|---|---|---|---|---|---|---|---|
| A1 | 58.4/22.1/19.5 | 10 | 2.39 | 4.53 | 0.12 | 45.77 | 1.72 | 6.23 | 177616 |
| A2 | 58.6/21.9/19.5 | 10 | 1.64 | 5.48 | 0.20 | 41.98 | 1.6 | 6.17 | 32670 |
| A3 | 49.0/18.4/32.7 | 10 | 0.69 | 6.26 | 0.98 | 49.35 | 1.53 | 7.39 | 40619 |
| A4 | 56.8/25.0/18.2 | 10 | 0.97 | 0 | 0 | 44.17 | 5.15 | 8.18 | 55212 |
| A5 | 48.2/18.7/33.1 | 10 | 0 | 1.68 | 0 | 49.83 | 1.69 | 7.14 | 32576 |
| A6 | 48.2/18.7/33.1 | 10 | 0 | 0.75 | 0 | 48.71 | 1.82 | 6.13 | 12200 |
| A7 | 60.0/20.7/19.3 | 10 | 0.60 | 0.64 | 0 | 47.29 | 1.68 | 5.52 | 7406 |

AL monomer: Unsaturated alcoholic monomer, DCA monomer: Unsaturated dicarboxylic acid monomer, CA monomer: Unsaturated monocarboxylic acid monomer, and EO: Ethylene oxide.

TABLE 2

| Water-soluble copolymer | AL monomer/DCA monomer/CA (Introducing ratio, weight ratio) | Addition number of moles of EO to AL monomer | Residual amount of monomer (weight %) AL monomer | DCA monomer | CA monomer | Solid Content (%) | pH | Acid Value (meq/g) | Molecular weight (Mw) |
|---|---|---|---|---|---|---|---|---|---|
| A8 | 76.0/6.3/17.7 | 10 | 0.84 | 0.09 | 0.21 | 53.29 | 2.31 | 3.28 | 42251 |
| A9 | 76.0/12.4/11.6 | 10 | 0 | 0.04 | 0 | 47.43 | 2.16 | 3.28 | 9399 |
| A10 | 76.0/12.4/11.6 | 10 | 0 | 4.82 | 0 | 46.73 | 2.07 | 3.18 | 4426 |
| A11 | 76.0/3.1/20.9 | 10 | 1.60 | 1.33 | 0.40 | 51.06 | 2.01 | 2.89 | 6997 |
| A12 | 60.0/20.7/19.3 | 25 | 0.6 | 2.03 | 0 | 47.63 | 1.72 | 5.57 | 7550 |
| A13 | 60.0/20.7/19.3 | 50 | 1.02 | 3.80 | 0 | 47.65 | 1.63 | 5.70 | 8403 |
| A14 | 60.0/11.5/28.5 | 50 | 0.3 | 1.63 | 0 | 48.14 | 1.54 | 5.38 | 22251 |
| A15 | 60.0/11.5/28.5 | 25 | 0 | 0.78 | 0 | 52.4 | 1.74 | 5.07 | 26947 |
| A16 | 40.0/24.5/35.5 | 50 | 5.4 | 5.62 | 0.03 | 46.01 | 1.70 | 8.74 | 18200 |
| A17 | 85.0/7.8/7.2 | 10 | 34.8 | 1.85 | 0 | 40.82 | 2.42 | 2.12 | 8300 |
| Comparative A1 | 58.4/25.7/15.9 | 10 | 0 | 10.3 | 0.05 | 39.7 | 1.42 | 6.64 | 229800 |
| Comparative A2 | 92.9/4.4/2.7 | 10 | 51.1 | 0.18 | 0 | 61.8 | 2.56 | 1.20 | 6700 |

AL monomer: Unsaturated alcoholic monomer, DCA monomer: Unsaturated dicarboxylic acid monomer, CA monomer: Unsaturated monocarboxylic acid monomer, and EO: Ethylene oxide.

EXAMPLE A18

The novel copolymers as obtained in the above examples were used as liquid detergent builders, and their calcium ion scavengeability and clay dispersibility were evaluated in the following way. The results were listed in Table 3.

(Calcium Ion Scavengeability)

First, calcium ion standard solutions for drawing a calibration curve were prepared by the following steps of preparing 50 g each of aqueous solutions of 0.01 mol/l, 0.001 mol/l, and 0.0001 mol/l respectively by use of calcium chloride dihydrate, and then adjusting their pH into the range of 9 to 11 with an aqueous NaOH solution of 4.8%, and then adding thereto 1 ml of an aqueous potassium chloride solution of 4 mol/l (hereinafter, abbreviated as "aqueous 4M-KCl solution"), and then sufficiently stirring the resultant mixture with a magnetic stirrer, thus preparing the sample solutions for drawing the calibration curve. In addition, a needed amount (50 g per sample) of aqueous solution of 0.001 mol/l was prepared as a test calcium ion standard solution similarly by the use of calcium chloride dihydrate.

Next, 10 mg (in terms of solid content) of a test sample (polymer) was weighed out into a beaker of 100 cc, and thereto 50 g of the above test calcium ion standard solution was added, and then the contents of the beaker were stirred with a magnetic stirrer enough. Furthermore, similarly to the sample solutions for drawing the calibration curve, the pH of the resultant mixture was adjusted into the range of 9 to 11 with an aqueous NaOH solution of 4.8%, and then thereto 1 ml of the aqueous 4M-KCl solution was added, thus preparing a test sample solution.

The sample solutions for drawing the calibration curve and the test sample solution, as prepared in the above ways, were measured with a calcium ion electrode 93-20 and a comparative electrode 90-01 (made by Olion Co.) using a titration apparatus COMTITE-550 (made by Hiranuma Sangyo Co., Ltd.).

The amount of calcium ion, as scavenged by the sample (polymer), was determined by calculation from the calibration curve and the measured value of the test sample solution. Then, the determined amount per g of the solid content of the polymer was denoted by the grams in terms of calcium carbonate, and its value was regarded as the calcium ion scavengeability value.

(Clay Dispersibility (Calcium Carbonate of 50 ppm))

Ion-exchanged water was added to 67.56 g of glycine, 52.6 g of sodium chloride, and 2.4 g of NaOH to adjust the total weight to 600 g (referred as a buffer (1)). Then, 0.0817 g of calcium chloride dihydrate was added to 60 g of the buffer (1), and further water was added thereto to adjust the total weight to 1000 g (referred as a buffer (2)). Then, 36 g of the buffer (2) was added to 4 g of aqueous solution containing a copolymer to be measured in a concentration of 0.1 weight % in terms of solid content, and the resultant mixture was stirred to obtain a dispersion. After placing 0.3 g of clay (made by Japan Powder Industrial Technical Society, 11 types of test dust) into a test tube (made by IWAKI GLASS, diameter: 18 mm, and height: 180 mm), 30 g of the above dispersion was added thereto, and the test tube was sealed.

The test tube was shaken so that the clay would be dispersed uniformly. The test tube was then allowed to stand stationary for 20 hours in a place as not exposed to direct sunlight. After 20 hours, 5 ml of supernatant of the dispersion was sampled, and the absorbance of the sampled supernatant was measured with a UV spectroscope (made by Shimadzu Seisakusho, UV-1200; a cell of 1 cm, wave length =380 nm). It means that: the larger this value is, the higher the clay dispersibility is.

(Clay Dispersibility (Calcium Carbonate of 200 ppm))

Ion-exchanged water was added to 67.56 g of glycine, 52.6 g of sodium chloride, and 2.4 g of NaOH to adjust the total weight to 600 g (referred as a buffer (1)). Then, 0.3268 g of calcium chloride dihydrate was added to 60 g of the buffer (1), and further water was added thereto to adjust the total weight to 1000 g (referred as a buffer (3)). Then, 36 g of the buffer (3) was added to 4 g of aqueous solution containing a copolymer to be measured in a concentration of 0.1 weight % in terms of solid content, and the resultant mixture was stirred to obtain a dispersion. After placing 0.3 g of clay (made by Japan Powder Industrial Technical Society, 11 types of test dust) into a test tube (made by IWAKI GLASS, diameter: 18 mm, and height: 180 mm), 30 g of the above dispersion was added thereto, and the test tube was sealed.

The test tube was shaken so that the clay would be dispersed uniformly. The test tube was then allowed to stand stationary for 20 hours in a place as not exposed to direct sunlight. After 20 hours, 5 ml of supernatant of the dispersion was sampled, and the absorbance of the sampled supernatant was measured with a UV spectroscope (made by Shimadzu Seisakusho, UV-1200; a cell of 1 cm, wave length =380 nm). It means that: the larger this value is, the higher the clay dispersibility is.

TABLE 3

| Water-soluble copolymer | Evaluated performance as detergent builder | | |
|---|---|---|---|
| | Calcium ion scavengeability (mg CaCO$_3$/g) | Clay dispersibility | |
| | | 50 ppm | 200 ppm |
| A1 | 169 | 0.663 | 0.239 |
| A2 | 160 | 1.151 | 0.684 |
| A3 | 183 | 0.868 | 0.49 |
| A4 | 186 | 1.591 | 0.627 |
| A5 | 186 | 1.122 | 0.607 |
| A6 | 176 | 1.198 | 0.709 |
| A7 | 143 | 1.176 | 0.419 |
| A8 | 102 | 0.904 | 0.506 |
| A9 | 95 | 1.287 | 0.332 |
| A10 | 73 | 0.795 | 0.183 |
| A11 | 63 | 0.481 | 0.111 |

TABLE 3-continued

| Water-soluble copolymer | Evaluated performance as detergent builder | | |
|---|---|---|---|
| | Calcium ion scavengeability (mg CaCO$_3$/g) | Clay dispersibility | |
| | | 50 ppm | 200 ppm |
| A12 | 152 | 0.727 | 0.15 |
| A13 | 146 | 0.588 | 0.167 |
| A16 | 230 | 0.736 | 0.255 |

EXAMPLE A19

The recontamination inhibitabilities were evaluated by using the novel copolymers as obtained in the above examples as detergent builders. That is to say, cotton cloth (cotton cloth according to JIS-L0803(Kanakin 3 gou)), was cut into pieces of 5 cm×5 cm and one set comprised 8 pieces of cut cloth. Then, clay and 8 pieces of white cloth was added to 1 liter of aqueous detergent solution for evaluation, and the experiment was carried out with a Terg-O-Tometer under the following condition. A sample obtained by not adding builders was evaluated as a comparative example. The results were listed in Table 4.

<Experimental Condition>

Detergent concentration: The following detergent combination was applied, a surfactant (SFF-70H) was added so that the concentration thereof would be adjusted to 350 ppm.

Detergent combination: SFT-70H (Softanol 70H, made by Nippon Shokubai Co., Ltd. polyoxyethylene alkyl ether); 50 g
Diethanolamine; 10 g
Ethaonl; 5 g
Propyleneglycol; 5 g
Water; 30 g Amount of added builder: 44 ppm (in terms of solid content)

Hardness of water: 3° DH (53.6 ppm, in terms of calcium carbonate)

Temperature of water: 25° C.

Amount of used water: 1 liter including a detergent and a polymer

Used cloth: Cotton cloth (cotton cloth according to JIS-L0803(Kanakin 3 gou)), 5 cm×5 cm, 8 pieces Clay: 11 types of test dust (Kanto loam, super fine particle, made by Japan Powder Industrial Technical Society), 500 ppm Washing time: 10 minutes (Terg-O-Tometer, 100 rpm)

Rinsing time: 2 minutes (Terg-O-Tometer, 100 rpm)

Experimental method: Washing and rinsing were thrice repeated. The reflectances (Hunter whiteness degrees) of original cloth (white cloth) before washing and contaminated cloth after experiment were measured with a coloriometric color difference meter (made by Nippon Denshoku Kogyo Co., Ltd., SE2000). The recontamination-inhibiting ratio was calculated from the following equation:

Recontamination-inhibiting ratio (%)=(reflectance after experiment)/(reflectance of original cloth)×100

TABLE 4

| Copolymer as builder | Recontamination-inhibiting ratio (%) |
|---|---|
| Water-soluble copolymer 5A | 75.8 |
| Water-soluble copolymer 9A | 73.7 |
| Water-soluble copolymer 13A | 78.1 |
| None | 60.3 |

EXAMPLES A20 TO A25 AND COMPARATIVE EXAMPLE A4 AND A5

The novel copolymers as obtained in the above examples were used as detergent builders, and detergency experiments were carried out. Accordingly, the performance of liquid detergent compositions comprising the builders was evaluated. That is to say, 5 pieces of artificially contaminated wet cloth (one set, made by Japanese Laundry Research Association) were used and placed into 500 ml of aqueous detergent solution for evaluation, and the experiment was carried out with a Terg-O-Tometer under the following condition. The results were listed in Table 5. The value of the amount as added in Table 5 denoted that in terms of solid content or effective content, and the value of the detergent combination or amount of the builder denoted weight %.

<Experimental Condition>

Detergent concentration: The following detergent combination was applied, surfactants (SFT-70H and NEOPELEX F-65) were added so that the concentration thereof would be adjusted to 350 ppm.

Detergent combination: SFT-70H (Softanol 70H, made by Nippon Shokubai Co., Ltd. polyoxyethylene alkyl ether); 10 g
  NEOPELEX F-65 (Kao Corporation, dodecylbenzenesulfonic acid sodium salt); 46.2 g (effective content: 30 g)
  Diethanolamine; 10 g
  Ethanol; 5 g
  Propyleneglycol; 15 g
  Water; 13.8 g Amount of added polymer: 44 ppm or 88 ppm (in terms of solid content)
Hardness of water: 3 ° DH (53.6 ppm, in terms of calcium carbonate)
Temperature of water: 25° C.
Amount of used water: 500 ml
Cloth as contaminated: Artificially contaminated wet cloth made by Japanese Laundry Research Association Washing time: 10 minutes (Terg-O-Tometer, 100 rpm)

Rinsing time: 2 minutes (Terg-O-Tometer, 100 rpm)

Experimental method: Washing and rinsing were thrice repeated. The reflectance (Hunter whiteness degree) of original cloth (white cloth) before washing and contaminated cloth after experiment was measured with a coloriometric color difference meter (made by Nippon Denshoku Kogyo Co., Ltd., SE2000). The detergency ratio was calculated from the following equation:

Detergency ratio (%)=[{(reflectance of contaminated cloth after washing)−(reflectance of contaminated cloth before washing)}/{(reflectance of white cloth)−(reflectance of contaminated cloth before washing)}]×100

TABLE 5

| | | Example A20 | Example A21 | Example A22 | Comparative Example A4 | Example A23 | Example A24 | Example A25 | Comparative Example A5 |
|---|---|---|---|---|---|---|---|---|---|
| Detergent combination | SFT-70H | 10 | 10 | 10 | 10 | 10 | 10 | 10 | 10 |
| | NEOPELEX F-65 | 30 | 30 | 30 | 30 | 30 | 30 | 30 | 30 |
| | Diethanolamine | 10 | 10 | 10 | 10 | 10 | 10 | 10 | 10 |
| | Ethanol | 5 | 5 | 5 | 5 | 5 | 5 | 5 | 5 |
| | Propylene glycol | 15 | 15 | 15 | 15 | 15 | 15 | 15 | 15 |
| | Water | Balance | Balance | Balance | Balance | Balance | Balance | Balance | Balance |
| Builder | Zeolite | 20 | 20 | 20 | 20 | | | | |
| | Water-soluble copolymer A5 | 10 | | | | 5 | | | |
| | Water-soluble copolymer A7 | | 10 | | | | 5 | | |
| | Water-soluble copolymer A13 | | | 10 | | | | 5 | |
| | Detergency ratio (%) | 49.3 | 49.2 | 48.9 | 46.9 | 45.2 | 44.5 | 44.7 | 40.4 |

EXAMPLES A26 TO A43 AND COMPARATIVE EXAMPLES A6 TO A10

The detergent compositions comprising the novel copolymers as obtained in the above examples were used, and the compatibilities with liquid detergents were evaluated.

That is to say, various detergent compositions were prepared by using the novel copolymers as obtained in the examples and components listed in Tables 6 to 8 below. Each component was sufficiently stirred in order to mix it uniformly, and the turbidity was measured at 25° C. after removing bubbles. The turbidity (kaolin turbidity: mg/l) was measured with a turbidmeter (made by Nippon Denshoku Kogyo Co., Ltd., NDH2000).

The results as evaluated were represented by the following three standards.

○: The turbidity was in the range of 0 to 50, the composition was not separated, participated, or turbid at sight.

Δ: The turbidity was in the range of 50 to 200, the composition was slightly turbid at sight.

×: The turbidity was in the range of not less than 200, the composition was turbid at sight.

The above results were listed in Tables 6 to 8.

Incidentally, poly(sodium acrylate) (weight-average molecular weight Mw of 7,000, made by Nippon Shokubai Co., Ltd.) was used as a comparative sample.

Incidentally, the value of the amount as added in Tables 6 to 8 denoted that in terms of solid content or effective content, and the value of the detergent combination or amount of the builder denoted weight %. In addition, QUARTAMIN 86W denoted steady trimethyammonium chloride (made by Kao Corporation) in the tables.

TABLE 6

| | | Example A26 | Example A27 | Example A28 | Example A29 | Comparative Example A6 | Example A30 | Example A31 | Example A32 | Comparative Example A7 |
|---|---|---|---|---|---|---|---|---|---|---|
| Detergent combination | SFT-70H | 45 | 50 | 50 | 50 | 50 | 32 | 32 | 32 | 32 |
| | NEOPELEX F-65 | | | | | | 3 | 3 | 3 | 3 |
| | QUARTAMIN 86W | | | | | | | | | |
| | Diethanolamine | 10 | 10 | 10 | 10 | 10 | 10 | 10 | 10 | 10 |
| | Ethanol | 5 | 5 | 5 | 5 | 5 | 5 | 5 | 5 | 5 |
| | Propylene glycol | 5 | 5 | 5 | 5 | 5 | 5 | 5 | 5 | 5 |
| | Water | Balance | Balance | Balance | Balance | Balance | Balance | Balance | Balance | Balance |
| Builder | Water-soluble copolymer A1 | 1 | | | | | | | | |
| | Water-soluble copolymer A3 | | 5 | | | | | | | |
| | Water-soluble copolymer A7 | | | 5 | | | | 1 | 3 | |
| | Water-soluble copolymer A8 | | | | 5 | | | | | 1 |
| | Poly(sodium acrylate) | | | | | 1 | | | | 1 |
| | Compatibility | ○ | ○ | ○ | ○ | x | ○ | Δ | Δ | x |

TABLE 7

| | | Example A33 | Example A34 | Example A35 | Comparative Example A6 | Example A36 | Example A37 | Example A38 | Example A39 | Comparative Example A9 |
|---|---|---|---|---|---|---|---|---|---|---|
| Detergent combination | SFT-70H | 28 | 28 | 28 | 28 | 11 | 11 | 11 | 11 | 11 |
| | NEOPELEX F-65 | 3.5 | 3.5 | 3.5 | 3.5 | 32 | 32 | 32 | 32 | 32 |
| | QUARTAMIN 86W | 3.5 | 3.5 | 3.5 | 3.5 | | | | | |
| | Diethanolamine | 10 | 10 | 10 | 10 | 10 | 10 | 10 | 10 | 10 |
| | Ethanol | 5 | 5 | 5 | 5 | 5 | 5 | 5 | 5 | 5 |
| | Propylene glycol | 5 | 5 | 5 | 5 | 5 | 5 | 5 | 5 | 5 |
| | Water | Balance | Balance | Balance | Balance | Balance | Balance | Balance | Balance | Balance |
| Builder | Water-soluble copolymer A1 | | | | | 5 | | | | |
| | Water-soluble copolymer A3 | | | | | | 5 | | | |
| | Water-soluble copolymer A7 | 1 | 3 | | | | | 5 | | |
| | Water-soluble copolymer A8 | | | | 1 | | | | 1 | |
| | Poly(sodium acrylate) | | | | 1 | | | | | 1 |
| | Compatibility | ○ | Δ | Δ | x | ○ | ○ | ○ | ○ | x |

TABLE 8

| | | Example A40 | Example A41 | Example A42 | Example A43 | Comparative Example A10 |
|---|---|---|---|---|---|---|
| Detergent combination | SFT-70H | | | | | |
| | NEOPELEX F-65 | 40 | 40 | 40 | 40 | 40 |
| | QUARTAMIN 86W | | | | | |
| | Diethanolamine | 10 | 10 | 10 | 10 | 10 |
| | Ethanol | 5 | 5 | 5 | 5 | 5 |
| | Propylene glycol | 15 | 15 | 15 | 15 | 15 |
| | Water | Balance | Balance | Balance | Balance | Balance |
| Builder | Water-soluble copolymer A1 | 5 | | | | |
| | Water-soluble copolymer A3 | | 5 | | | |
| | Water-soluble copolymer A7 | | | 5 | | |
| | Water-soluble copolymer A8 | | | | 5 | |
| | Poly(sodium acrylate) | | | | | 1 |
| | Compatibility | ○ | ○ | ○ | ○ | x |

EXAMPLE A44

The novel copolymers as obtained in the above examples according to the present invention, and poly(sodium acrylate) having a weight-average molecular weight of 7,000 as a comparative sample were used as pigment dispersants, and the dispersibilities of pigments were confirmed by measuring the following slurry viscosity.

First, a slurry was prepared so that the ratio of light calcium carbonate (Brilliant 1500, made by Shiraishi Industry Co., Ltd.)/water would be adjusted to 60/40 (weight ratio). A polymer was added thereto in an amount of 0.5 weight based on the weight of calcium carbonate, and the resultant mixture was stirred for 3 minutes. After the mixture was left still for one minute, the viscosity was measured by a B type viscometer (made by Tokyo Keiki). When the polymer was not added, the slurry does not have fluidity and the viscosity could not be measured.

Next, a slurry was prepared so that the ratio of heavy calcium carbonate (Escalon, made by Sankyo Seifun Co., Ltd.)/water would be adjusted to 70/30 (weight ratio). A polymer was added thereto in an amount of 0.5 weight based on the weight of calcium carbonate, and the resultant mixture was stirred for 3 minutes. After the mixture was left still for one minute, the viscosity was measured by a B type viscometer (made by Tokyo Keiki). When the polymer was not added, the slurry does not have fluidity and the viscosity could not be measured.

In addition, a slurry was prepared so that the ratio of kaolin (ALPHA COTE, made by Somar Co., Ltd.)/water polymer would be adjusted to 70/30 (weight ratio). A polymer was added thereto in an amount of 0.5 weight based on the weight of kaolin, and the resultant mixture was stirred for 3 minutes. After the mixture was left still for one minute, the viscosity was measured by a B type viscometer (made by Tokyo Keiki). When the polymer was not added, the slurry does not have fluidity and the viscosity could not be measured.

The results were listed in Table 9.

TABLE 9

| | Slurry viscosity (cps) | | |
| --- | --- | --- | --- |
| | Light calcium carbonate | Heavy calcium carbonate | Kaolin |
| Water-soluble copolymer A7 | 2000 | 120 | 1200 |
| Water-soluble copolymer A13 | 2150 | 220 | 1300 |
| Water-soluble copolymer A16 | 1950 | 110 | 1100 |
| Poly(sodium acrylate) | 3600 | 700 | 1800 |

EXAMPLE A45

The novel copolymers as obtained in the above examples according to the present invention, and poly(sodium acrylate) having a weight-average molecular weight of 7,000 as a comparative sample were used as water-treating agents, and the performance of the water-treating agent were evaluated by carrying out the following gelatability test.

That is to say, to a tall beaker of 500 ml in capacity, deionized water, a pH buffer solution of boric acid-sodium borate, an aqueous solution of a polymer of 1%, and calcium chloride solution were added in order to prepare 500 ml of a test solution having a boron concentration of 4 mmol/liter, pH of 8.5, a solid content of the polymer of 100 mg per liter, and calcium hardness of 1000 mg $CaCO_3$ per liter. The tall beaker was sealed with a polyethylene film, and placed in an isothermal water bath of 90° C., and then, left for one hour. Thereafter, the turbidity of the test liquid, which was caused by a gel formed by combining the copolymer with the calcium ion, was detected by measuring the absorbance of the test liquid with a quartz cell of 50 mm at a wave length of 380 nm. This value was regarded as the gelatability. The smaller the value is, the more excellent the gelatability is.

The results were listed in Table 10.

TABLE 10

| | Gelatability |
| --- | --- |
| Water-soluble copolymer A7 | 0.009 |
| Water-soluble copolymer A12 | 0.010 |
| Water-soluble copolymer A13 | 0.008 |
| Water-soluble copolymer A16 | 0.011 |
| Poly(sodium acrylate) | 2.515 |

EXAMPLE A46

The novel copolymers as obtained in the above examples according to the present invention, and poly(sodium acrylate) having a weight-average molecular weight of 7,000 as a comparative sample were used as water-treating agents, and the performance of the water-treating agent were evaluated by measuring the scale inhibition rate in the following.

That is to say, 1,000 ml of a test liquid (concentration of calcium ion: 500 ppm in terms of $CaCO_3$, concentration of hydrogen carbonate: 500 ppm in terms of $CaCO_3$, amount of scale inhibitor: 2 or 4 ppm in terms of solid content of the polymer), which was prepared by adding calcium chloride, sodium hydrogen carbonate, and a scale inhibitor, was adjusted to pH of 8.5 with an aqueous sodium hydroxide solution. Thereafter, the resultant test liquid was sealed in a vessel, and left still at 60° C. for 20 hours. Then, the test liquid was filtrated with a membrane filter of 0.1 im, and the concentration of calcium (C ppm in terms of $CaCO_3$) in the resultant filtrate was determined by EDTA titration. On the other hand, the titration was carried out in the same way except for not adding the scale inhibitor, and the blank concentration of calcium (BC ppm in terms of $CaCO_3$) in the resultant filtrate was determined. Then, the scale inhibition rate was calculated in accordance with the following equation:

$$\text{Scale inhibition rate } (\%) = (C-BC)/(500-BC) \times 100$$

The results were listed in Table 11.

TABLE 11

| | Scale inhibition rate | |
| --- | --- | --- |
| | Amount of polymer as added (2 ppm) | Amount of polymer as added (4 ppm) |
| Water-soluble copolymer A7 | 67 | 82 |
| Water-soluble copolymer A12 | 63 | 83 |
| Water-soluble copolymer A13 | 68 | 82 |
| Water-soluble copolymer A16 | 76 | 88 |
| Poly(sodium acrylate) | 73 | 84 |

Synthesis Example B1

A separable flask of 300 ml in capacity with a stirrer, a condenser, a thermometer, a nitrogen introducing tube, and a dropping funnel was charged with 150 g of unsaturated alcohol (produced by an addition reaction of 10 mols of ethylene oxide to 3-methyl-2-buten-1-ol, hereinafter, referred as IPN-10) and 100 g of pure water, and then they were heated to 95° C. while being stirred. When the temperature reached 95° C., a solution obtained by dissolving 33.1 g of maleic acid and 6.5 g of ammonium persulfate with 70 g of pure water was dropwise added thereto over a period of 120 minutes. After the addition of the solution, the resultant reaction mixture was aged at the same temperature (95+5° C.) for an hour to complete the polymerization, thus obtaining a water-soluble copolymer (B 1). The properties of the copolymer as obtained were listed in Table 12.

Synthesis Examples B2 to B13

Water-soluble copolymers (B2) to (1313) were obtained in the same way as of Synthesis Example B 1 except for changing the combination of raw materials and the polymerization conditions. The properties of the copolymers as obtained were listed in Table 12.

TABLE 13-continued

| Water-soluble copolymer | Evaluated performance as detergent builder | | |
|---|---|---|---|
| | Calcium ion scavengeability (mg CaCO$_3$/g) | Clay dispersibility | |
| | | 50 ppm | 200 ppm |
| (B11) | 101 | 0.969 | 0.383 |
| (B12) | 112 | 0.462 | 0.230 |
| (B13) | 61 | 0.208 | 0.139 |

TABLE 12

| Water-soluble copolymer | Un saturated alcoholic monomer/un saturated carboxylic acid monomer (Introducing ratio, weight ratio) | Addition number of moles of EO to unsaturated alcoholic monomer | Unsaturated carboxylic acid monomer | Polymerization temperature (° C.) | Initiator | | Molecular weight (Mw) |
|---|---|---|---|---|---|---|---|
| | | | | | Kind | Amount as added (wt % based on all the monomers) | |
| B1 | 81.9/18.1 | 10 | MA | 95 | APS | 3.55 | 5700 |
| B2 | 91.9/8.9 | 25 | MA anhydride | 95 | APS | 1.77 | 4900 |
| B3 | 95.2/4.8 | 50 | MA anhydride | 95 | APS | 0.96 | 4800 |
| B4 | 76.0/24.0 | 10 | MMA | Refluxing temperature (about 103° C.) | Fe(II)/H$_2$O$_2$ | 46 ppm/ 3.25 wt % | 190000 |
| B5 | 51.6/48.4 | 10 | AA/AMA | 100 | APS | 1.95 | 145000 |
| B6 | 51.6/48.4 | 10 | AA/AMA | Refluxing temperature | APS | 1.95 | 14200 |
| B7 | 23.0/77.0 | 0 | AA/AMA | 100 | APS | 2.97 | 77400 |
| B8 | 70.8/29.2 | 10 | AA | 65 | H$_2$O$_2$/L-As/MPA | 0.37/0.47/0.75 | 78600 |
| B9 | 88.0/12.0 | 10 | AA | 65 | H$_2$O$_2$/L-As/MPA | 0.23/0.29/0.26 | 41700 |
| B10 | 65.0/35.0 | 10 | AA/AMA | Refluxing temperature | APS | 1.45 | 9500 |
| B11 | 65.0/35.0 | 25 | AA/AMA | Refluxing temperature | APS | 1.29 | 22100 |
| B12 | 65.0/35.0 | 50 | AA/AMA | Refluxing temperature | APS | 1.22 | 26600 |
| B13 | 86.0/14.0 | 75 | AA | 65 | H$_2$O$_2$/L-As/MPA | 0.24/0.32/0.49 | 53200 |

EO: Ethylene oxide, MA: Maleic acid, MA anhydride: Maleic anhydride, MAA: Methacrylic acid, AA: Acrylic acid, AMA: Ammonium acrylate, APS: Ammonium persulfate, Fe (II): Mohr's salt, H$_2$O$_2$: Hydrogen peroxide, L-As: L-Ascorbic acid, and MPA: Mercaptopropionic acid (chain transfer agent)

EXAMPLE B1

The water-soluble copolymers as obtained in the above synthesis examples were used as liquid detergent builders, and their calcium ion scavengeability and clay dispersibility were evaluated in the same way as of Example A18. The results were listed in Table 13.

TABLE 13

| Water-soluble copolymer | Evaluated performance as detergent builder | | |
|---|---|---|---|
| | Calcium ion scavengeability (mg CaCO$_3$/g) | Clay dispersibility | |
| | | 50 ppm | 200 ppm |
| (B1) | 78 | 0.58 | 0.042 |
| (B2) | 35 | 0.109 | 0.046 |
| (B3) | 22 | 0.08 | 0.048 |
| (B4) | 72 | 0.298 | 0.235 |
| (B5) | 183 | 0.332 | 0.126 |
| (B6) | 165 | 1.086 | 0.593 |
| (B7) | 223 | 0.275 | 0.159 |
| (B8) | 91 | 0.895 | 0.565 |
| (B9) | 52 | 0.282 | 0.092 |
| (B10) | 88 | 0.924 | 0.435 |

EXAMPLES B2 TO B6 AND COMPARATIVE EXAMPLE B1

The recontamination inhibitabilities were evaluated by using the water-soluble copolymers as obtained in the above synthesis examples as liquid detergent builders in the same way as of Example A19. The results were listed in

TABLE 14

| Copolymer as builder | | Recontamination-inhibiting ratio (%) |
|---|---|---|
| Example B2 | Water-soluble copolymer (1) | 70.2 |
| Example B3 | Water-soluble copolymer (4) | 67.7 |
| Example B4 | Water-soluble copolymer (6) | 75.9 |
| Example B5 | Water-soluble copolymer (12) | 71.7 |
| Example B6 | Water-soluble copolymer (13) | 65.1 |
| Comparative Example B1 | none | 60.3 |

EXAMPLES B7 TO B11 AND COMPARATIVE EXAMPLE B2

The water-soluble copolymers as obtained in the above synthesis examples were used as liquid detergent builders and detergency experiments were carried out in the same way as of Example A20 The results were listed in table 15.

TABLE 15

|  |  | Example B7 | Example B8 | Example B9 | Example B10 | Example B11 | Comparative Example B2 |
|---|---|---|---|---|---|---|---|
| Detergent combination | SFT-70H | 10 | 10 | 10 | 10 | 10 | 10 |
|  | NEOPELEX F-65 | 30 | 30 | 30 | 30 | 30 | 30 |
|  | Diethanolamine | 10 | 10 | 10 | 10 | 10 | 10 |
|  | Ethanol | 5 | 5 | 5 | 5 | 5 | 5 |
|  | Propylene glycol | 15 | 15 | 15 | 15 | 15 | 15 |
|  | Water | Balance | Balance | Balance | Balance | Balance | Balance |
| Builder | Water-soluble copolymer (B1) | 5 |  |  |  |  |  |
|  | Water-soluble copolymer (B4) |  | 5 |  |  |  |  |
|  | Water-soluble copolymer (B6) |  |  | 5 |  |  |  |
|  | Water-soluble copolymer (B12) |  |  |  | 5 |  |  |
|  | Water-soluble copolymer (B13) |  |  |  |  | 5 |  |
|  | Detergency ratio (%) | 42.1 | 41.9 | 44.9 | 43.1 | 41.5 | 40.4 |

EXAMPLES B12 TO B54 AND COMPARATIVE EXAMPLES B3 TO B8

The liquid detergent compositions comprising the water-soluble copolymers as obtained in the above synthesis examples were used, and the compatibilities with liquid detergents were evaluated in the same way as of Example A26. The results were listed in Tables 16 to 21.

Incidentally, poly(sodium acrylate) (weight-average molecular weight Mw of 7,000, made by Nippon Shokubai Co., Ltd.) was used as a comparative sample.

TABLE 16

|  |  | Example B12 | Example B13 | Example B14 | Example B15 | Example B16 | Example B17 | Example B18 | Example B19 | Comparative Example B3 |
|---|---|---|---|---|---|---|---|---|---|---|
| Detergent combination | SFT-70H | 40 | 40 | 50 | 50 | 50 | 50 | 50 | 50 | 40 |
|  | NEOPELEX F-65 |  |  |  |  |  |  |  |  |  |
|  | QUARTAMIN 86W |  |  |  |  |  |  |  |  |  |
|  | Diethanolamine | 10 | 10 | 10 | 10 | 10 | 10 | 10 | 10 | 10 |
|  | Ethanol | 5 | 5 | 5 | 5 | 5 | 5 | 5 | 5 | 5 |
|  | Propylene glycol | 5 | 5 | 5 | 5 | 5 | 5 | 5 | 5 | 5 |
|  | Water | Balance | Balance | Balance | Balance | Balance | Balance | Balance | Balance | Balance |
| Builder | Water-soluble copolymer (B1) |  |  | 3 |  |  |  |  |  |  |
|  | Water-soluble copolymer (B2) |  |  |  | 1 |  |  |  |  |  |
|  | Water-soluble copolymer (B3) | 1 |  |  |  | 1 |  |  |  |  |
|  | Water-soluble copolymer (B4) |  |  |  |  |  | 1 |  |  |  |
|  | Water-soluble copolymer (B5) |  |  |  |  |  |  | 3 |  |  |
|  | Water-soluble copolymer (B6) |  |  |  |  |  |  |  | 5 |  |
|  | Water-soluble copolymer (B13) |  | 1 |  |  |  |  |  |  |  |
|  | Poly(sodium acrylate) |  |  |  |  |  |  |  |  | 1 |
|  | Compatibility | ○ | ○ | ○ | ○ | Δ | ○ | ○ | ○ | x |

TABLE 17

|  |  | Example B20 | Example B21 | Example B22 | Example B23 | Example B24 | Example B25 | Example B26 | Example B27 | Comparative Example B4 |
|---|---|---|---|---|---|---|---|---|---|---|
| Detergent combination | SFT-70H | 50 | 50 | 50 | 50 | 50 | 50 | 36 | 36 | 50 |
|  | NEOPELEX F-65 |  |  |  |  |  |  | 4 | 4 |  |
|  | QUARTAMIN 86W |  |  |  |  |  |  |  |  |  |
|  | Diethanolamine | 10 | 10 | 10 | 10 | 10 | 10 | 10 | 10 | 10 |
|  | Ethanol | 5 | 5 | 5 | 5 | 5 | 5 | 5 | 5 | 5 |
|  | Propylene glycol | 5 | 5 | 5 | 5 | 5 | 5 | 5 | 5 | 5 |
|  | Water | Balance | Balance | Balance | Balance | Balance | Balance | Balance | Balance | Balance |

TABLE 17-continued

|  |  | Example B20 | Example B21 | Example B22 | Example B23 | Example B24 | Example B25 | Example B26 | Example B27 | Comparative Example B4 |
|---|---|---|---|---|---|---|---|---|---|---|
| Builder | Water-soluble copolymer (B1) |  |  |  |  |  |  | 1 |  |  |
|  | Water-soluble copolymer (B2) |  |  |  |  |  |  |  | 1 |  |
|  | Water-soluble copolymer (B7) | 5 |  |  |  |  |  |  |  |  |
|  | Water-soluble copolymer (B8) |  | 1 |  |  |  |  |  |  |  |
|  | Water-soluble copolymer (B9) |  |  | 5 |  |  |  |  |  |  |
|  | Water-soluble copolymer (B20) |  |  |  | 5 |  |  |  |  |  |
|  | Water-soluble copolymer (B11) |  |  |  |  | 5 |  |  |  |  |
|  | Water-soluble copolymer (B13) |  |  |  |  |  | 1 |  |  |  |
|  | Poly(sodium acrylate) |  |  |  |  |  |  |  |  | 1 |
|  | Compatibility | ○ | ○ | ○ | ○ | ○ | ○ | ○ | ○ | X |

TABLE 18

|  |  | Example B28 | Example B29 | Example B30 | Example B31 | Example B32 | Example B33 | Example B34 | Comparative Example B5 | Comparative Example B6 |
|---|---|---|---|---|---|---|---|---|---|---|
| Detergent combination | SFT-70H | 36 | 36 | 32 | 32 | 32 | 32 | 11 | 32 | 36 |
|  | NEOPELEX F-65 | 4 | 4 | 4 | 4 | 4 | 4 | 32 | 4 | 4 |
|  | QUARTAMIN 86W |  |  | 4 | 4 | 4 | 4 | 4 |  |  |
|  | Diethanolamine | 10 | 10 | 10 | 10 | 10 | 10 | 10 | 10 | 10 |
|  | Ethanol | 5 | 5 | 5 | 5 | 5 | 5 | 5 | 5 | 5 |
|  | Propylene glycol | 5 | 5 | 5 | 5 | 5 | 5 | 15 | 5 | 5 |
|  | Water | Balance | Balance | Balance | Balance | Balance | Balance | Balance | Balance | Balance |
| Builder | Water-soluble copolymer (B1) |  |  | 1 |  |  |  | 5 |  |  |
|  | Water-soluble copolymer (B2) |  |  |  | 1 |  |  |  |  |  |
|  | Water-soluble copolymer (B3) | 1 |  |  |  | 1 |  |  |  |  |
|  | Water-soluble copolymer (B10) |  | 1 |  |  |  | 1 |  |  |  |
|  | Poly(sodium acrylate) |  |  |  |  |  |  |  | 1 | 1 |
|  | Compatibility | ○ | Δ | ○ | ○ | ○ | ○ | ○ | X | X |

TABLE 19

|  |  | Example B35 | Example B36 | Example B37 | Example B38 | Example B39 | Example B40 | Example B41 | Example B42 | Comparative Example B7 |
|---|---|---|---|---|---|---|---|---|---|---|
| Detergent combination | SFT-70H | 11 | 11 | 11 | 11 | 11 | 11 | 11 | 11 | 11 |
|  | NEOPELEX F-65 | 32 | 32 | 32 | 32 | 32 | 32 | 32 | 32 | 32 |
|  | QUARTAMIN 86W |  |  |  |  |  |  |  |  |  |
|  | Diethanolamine | 10 | 10 | 10 | 10 | 10 | 10 | 10 | 10 | 10 |
|  | Ethanol | 5 | 5 | 5 | 5 | 5 | 5 | 5 | 5 | 5 |
|  | Propylene glycol | 15 | 15 | 15 | 15 | 15 | 15 | 15 | 15 | 15 |
|  | Water | Balance | Balance | Balance | Balance | Balance | Balance | Balance | Balance | Balance |
| Builder | Water-soluble copolymer (B2) | 5 |  |  |  |  |  |  |  |  |
|  | Water-soluble copolymer (B3) |  | 5 |  |  |  |  |  |  |  |
|  | Water-soluble copolymer (B8) |  |  | 5 |  |  |  |  |  |  |
|  | Water-soluble copolymer (B9) |  |  |  | 5 |  |  |  |  |  |
|  | Water-soluble copolymer (B10) |  |  |  |  | 5 |  |  |  |  |
|  | Water-soluble copolymer (B11) |  |  |  |  |  | 5 |  |  |  |
|  | Water-soluble copolymer (B12) |  |  |  |  |  |  | 5 |  |  |
|  | Water-soluble copolymer (B13) |  |  |  |  |  |  |  | 5 |  |
|  | Poly(sodium acrylate) |  |  |  |  |  |  |  |  | 1 |
|  | Compatibility | ○ | ○ | ○ | ○ | ○ | ○ | ○ | ○ | X |

TABLE 20

|  |  | Example B43 | Example B44 | Example B45 | Example B46 | Example B47 | Example B48 | Example B49 | Example B50 | Example B51 |
|---|---|---|---|---|---|---|---|---|---|---|
| Detergent combination | SFT-70H NEOPELEX F-65 QUARTAMIN 86W | 40 | 40 | 40 | 40 | 40 | 40 | 40 | 40 | 40 |
|  | Diethanolamine | 10 | 10 | 10 | 10 | 10 | 10 | 10 | 10 | 10 |
|  | Ethanol | 5 | 5 | 5 | 5 | 5 | 5 | 5 | 5 | 5 |
|  | Propylene glycol | 15 | 15 | 15 | 15 | 15 | 15 | 15 | 15 | 15 |
|  | Water | Balance | Balance | Balance | Balance | Balance | Balance | Balance | Balance | Balance |
| Builder | Water-soluble copolymer (B1) | 5 |  |  |  |  |  |  |  |  |
|  | Water-soluble copolymer (B2) |  | 5 |  |  |  |  |  |  |  |
|  | Water-soluble copolymer (B3) |  |  | 5 |  |  |  |  |  |  |
|  | Water-soluble copolymer (B4) |  |  |  | 1 |  |  |  |  |  |
|  | Water-soluble copolymer (B5) |  |  |  |  | 5 |  |  |  |  |
|  | Water-soluble copolymer (B6) |  |  |  |  |  | 5 |  |  |  |
|  | Water-soluble copolymer (B8) |  |  |  |  |  |  | 5 |  |  |
|  | Water-soluble copolymer (B9) |  |  |  |  |  |  |  | 5 |  |
|  | Water-soluble copolymer (B10) |  |  |  |  |  |  |  |  | 5 |
|  | Compatibility | ◯ | ◯ | ◯ | ◯ | ◯ | ◯ | ◯ | ◯ | ◯ |

TABLE 21

|  |  | Example B52 | Example B53 | Example B54 | Comparative Example B8 |
|---|---|---|---|---|---|
| Detergent combination | SFT-70H NEOPELEX F-65 QUARTAMIN 86W | 40 | 40 | 40 | 40 |
|  | Diethanolamine | 10 | 10 | 10 | 10 |
|  | Ethanol | 5 | 5 | 5 | 5 |
|  | Propylene glycol | 15 | 15 | 15 | 15 |
|  | Water | Balance | Balance | Balance | Balance |
| Builder | Water-soluble copolymer (B11) | 5 |  |  |  |
|  | Water-soluble copolymer (B12) |  | 5 |  |  |
|  | Water-soluble copolymer (B13) |  |  | 5 |  |
|  | Poly(sodium acrylate) |  |  |  | 1 |
|  | Compatibility | ◯ | ◯ | ◯ | X |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A water-soluble copolymer, which is obtained by copolymerizing comonomers comprising: an unsaturated monocarboxylic acid monomer (1) as represented by a general formula (1) below; an unsaturated dicarboxylic acid monomer (2a) as represented by a general formula (2a) below and/or an unsaturated dicarboxylic acid monomer (2b) as represented by a general formula (2b) below; and an unsaturated alcoholic monomer (3) as represented by a general formula (3) below, with the copolymer having a residual amount of the unsaturated dicarboxylic acid monomer of not more than 8 weight %, and a residual amount of the unsaturated alcoholic monomer of not more than 45 weight %, wherein the general formula (1) is:

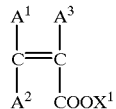

(1)

where: $A^1$, $A^2$, and $A^3$ each independently represent a hydrogen atom or a methyl group; and $X^1$ represents a hydrogen atom, a monovalent metal, a divalent metal, an ammonium group, or an organic amine group;

wherein the general formula (2a) is:

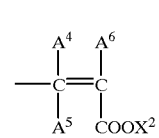

(2a)

where: $A^4$ and $A^5$ each independently represent a hydrogen atom, a methyl group, or —$COOX^3$; $A^6$ represents a hydrogen atom, a methyl group, or —$CH_2COOX^4$; only any one of $A^4$, $A^5$, and $A^6$ is —$COOX^3$ or —$CH_2COOX^4$; and $X^2$, $X^3$, and $X^4$ each independently or together represent a hydrogen atom, a monovalent metal, a divalent metal, an ammonium group, or an organic amine group;

wherein the general formula (2b) is:

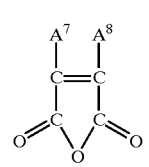

(2b)

where: $A^7$ and $A^8$ each independently represent a hydrogen atom or a methyl group; and wherein the general formula (3) is:

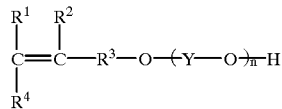
(3)

where: $R^1$, $R^2$ and $R^4$ each independently represent a hydrogen atom or a methyl group, and $R^1$ (or $R^4$) and $R^2$ are not simultaneously methyl groups; and $R^3$ represents —$CH_2$—, —$(CH_2)2$—, or —$C(CH_3)_2$—, and the total carbon atoms contained in $R^1$, $R^2$, $R^3$ and $R^4$ is 3; Y represents an alkylene group having 2 to 18 carbon atoms; and n is an integer of 1 to 300.

2. A novel water-soluble copolymer according to claim 1, which has a clay dispersibility (50 ppm of calcium carbonate) of not less than 0.3.

3. A novel water-soluble copolymer according to claim 1, which has a calcium ion scavengeability of not less than 60 mg/g.

4. A novel water-soluble copolymer according to claim 2, which has a calcium ion scavengeability of not less than 60 mg/g.

5. A detergent builder, which essentially includes the novel water-soluble copolymer as recited in claim 1.

6. A detergent builder, which essentially includes the novel water-soluble copolymer as recited in claim 4.

7. A detergent builder according to claim 5, which is used for liquid detergents.

8. A detergent builder according to claim 6, which is used for liquid detergents.

9. A detergent composition, which comprises a detergent builder essentially including the novel water-soluble copolymer as recited in claim 1.

10. A detergent composition, which comprises a detergent builder essentially including the novel water-soluble copolymer as recited in claim 4.

11. A detergent composition according to claim 9, which is used for liquid detergents.

12. A detergent composition according to claim 10, which is used for liquid detergents.

13. A pigment dispersant, which essentially comprises the novel water-soluble copolymer as recited in claim 1.

14. A scale inhibitor, which essentially comprises the novel water-soluble copolymer as recited in claim 1.

15. A novel water-soluble copolymer according to claim 1, wherein: the total amount of said unsaturated monocarboxylic acid monomer (1) and said unsaturated dicarboxylic acid monomer (2a) and/or (2b) is not less than 20 weight %, said unsaturated monocarboxylic acid monomer (1) and said unsaturated dicarboxylic acid monomer (2a) and/or (2b) are included in a ratio of (20 to 90)/(80 to 10) by weight, and the amount of said unsaturated alcoholic monomer (3) is not less than 5 weight %.

* * * * *